United States Patent
Grootaert et al.

(10) Patent No.: US 6,887,927 B2
(45) Date of Patent: May 3, 2005

(54) FLUOROPOLYMER COMPOSITIONS CONTAINING A NITROGEN CURE SITE MONOMER AND A SULFONE OR SULFOXIDE COMPOUND

(75) Inventors: Werner M.A. Grootaert, Oakdale, MN (US); Robert E. Kolb, Afton, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 123 days.

(21) Appl. No.: 10/228,507

(22) Filed: Aug. 27, 2002

(65) Prior Publication Data

US 2004/0044139 A1 Mar. 4, 2004

(51) Int. Cl.$^7$ ................................. C08K 5/41
(52) U.S. Cl. .................... 524/167; 524/173; 525/326.3; 525/326.4
(58) Field of Search ................ 524/167, 173; 525/326.3–326.4

(56) References Cited

U.S. PATENT DOCUMENTS

| | | | |
|---|---|---|---|
| 3,546,186 A | 12/1970 | Gladding et al. | |
| 3,752,787 A | 8/1973 | de Brunner | |
| 4,259,463 A | 3/1981 | Moggi et al. | |
| 4,281,092 A | 7/1981 | Breazeale | |
| 4,287,320 A | 9/1981 | Kolb | |
| 4,550,132 A | * 10/1985 | Capriotti | 524/84 |
| 4,694,045 A | 9/1987 | Moore | |
| 4,882,390 A | * 11/1989 | Kolb | 525/326.3 |
| 5,268,405 A | 12/1993 | Ojakaar et al. | |
| 5,284,611 A | * 2/1994 | Grootaert et al. | 264/135 |
| 5,554,680 A | 9/1996 | Ojakaar | |
| 5,565,512 A | 10/1996 | Saito et al. | |
| 5,585,449 A | 12/1996 | Arcella et al. | |
| 5,621,145 A | 4/1997 | Saito et al. | |
| 5,700,879 A | 12/1997 | Yamamoto et al. | |
| 5,728,773 A | 3/1998 | Jing et al. | |
| 5,767,204 A | 6/1998 | Iwa et al. | |
| 5,824,749 A | * 10/1998 | Sonoi et al. | 525/351 |
| 6,465,576 B1 | * 10/2002 | Grootaert et al. | 525/199 |
| 6,593,416 B2 | * 7/2003 | Grootaert et al. | 524/545 |
| 2002/0026014 A1 | 2/2002 | Bish et al. | |

FOREIGN PATENT DOCUMENTS

| | | |
|---|---|---|
| EP | 0 661 304 A1 | 7/1995 |
| EP | 0 769 521 A1 | 4/1997 |
| EP | 0 784 064 A1 | 7/1997 |
| WO | WO 01/02448 A1 | 1/2001 |
| WO | WO 02/48200 A2 | 6/2002 |
| WO | WO 02/060969 A1 | 8/2002 |

* cited by examiner

Primary Examiner—Bernard Lipman
(74) Attorney, Agent, or Firm—Dean M. Harts

(57) ABSTRACT

Compositions comprising a fluoropolymer derived from a nitrogen-containing cure site monomer, a catalyst composition which comprises at least one anionic functional group and at least one cationic functional group having the formula $QR'_k{}^{(+)}$, wherein Q is selected from phosphorous, sulfur, nitrogen, arsenic, or antimony, wherein each R' is independently selected from hydrogen and a nonfluorinated, partially fluorinated, or perfluorinated, $C_1$–$C_{20}$ alkyl, aryl, aralkyl, or alkenyl group, and wherein k is the valence of Q plus one; wherein the catalyst composition is a compound or the precursors thereof added separately or as a mixture; and a composition of the formula: $R''_2SO_x$ wherein each R'' is $C_1$–$C_{30}$ alkyl, aralkyl, the two R'' groups together form a heterocyclic $C_3$–$C_{30}$ cycloalkyl, aryl, or aralkyl, each R'' can be fluorinated, and x is 1 or 2. Also provided are methods of making a fluoropolymer and fluoropolymer articles containing fluoropolymer compositions.

33 Claims, No Drawings

FLUOROPOLYMER COMPOSITIONS CONTAINING A NITROGEN CURE SITE MONOMER AND A SULFONE OR SULFOXIDE COMPOUND

TECHNICAL FIELD

This invention relates to fluoropolymer compositions having nitrogen-containing cure-site components, making and curing such fluoropolymers, and the cured results.

BACKGROUND

Fluoropolymers are a commercially useful class of materials. Fluoropolymers include, for example, crosslinked fluoroelastomers, uncrosslinked fluoroelastomer gums, and semi-crystalline fluoroplastics. Fluoroelastomers exhibit significant tolerance to high temperatures and harsh chemical environments. They are particularly well adapted for use as seals, gaskets, and other molded parts in systems that are exposed to elevated temperatures and/or harsh chemicals. Such parts are widely used in the automotive, chemical processing, semiconductor, aerospace, and petroleum industries, among others.

Fluoroelastomers often include a cure-site component to facilitate curing in the presence of a catalyst. One class of useful cure-site components includes nitrile group-containing monomers, for which organotin catalysts have been used as curing components. These catalysts can leave undesirable extractable metal residues in the cured product and are undesirable for environmental reasons. Ammonia-generating compounds have also been used as a cure system component. These cure systems lack the desired level of rheology control during processing.

SUMMARY

In one aspect, the invention relates to a composition comprising (a) a fluoropolymer comprising interpolymerized units derived from a nitrogen-containing cure site monomer and less than about 10 mole percent of interpolymerized units derived from hydrogen-containing monomers, (b) a catalyst composition which includes at least one anionic functional group having the formula:

$R(A^{(-)})_n$ wherein A is an anionic acidic group or anionic derivative of an acidic group, n is 1–10, wherein R is hydrogen or a $C_1$–$C_{20}$ alkyl, alkenyl, alkylene, alkenylene, or higher-functional organic moiety, cyclic, aryl, or a combination thereof, wherein R is nonfluorinated, partially fluorinated, or perfluorinated, and wherein, when n is 2, R may be a direct bond between two A groups, and which catalyst composition includes at least one cationic functional group having the formula:

$QR'_k{}^{(+)}$ wherein Q is selected from phosphorous, sulfur, nitrogen, arsenic, or antimony, wherein each R' is independently selected from hydrogen and a nonfluorinated, partially fluorinated, or perfluorinated, $C_1$–$C_{20}$ alkyl, aryl, aralkyl, or alkenyl group, and wherein k is the valence of Q plus one; wherein the catalyst composition is a compound or the precursors thereof added separately or as a mixture, and (c) a composition having the formula:

$R''_2SO_x$ wherein each R" is independently $C_1$–$C_{30}$ alkyl, aralkyl, the R" groups together form a heterocyclic $C_3$–$C_{30}$ cycloalkyl, aryl, or aralkyl, each R" can be nonfluorinated, partially fluorinated, or perfluorinated, and x is 1 or 2.

In another aspect, the invention relates to a composition that includes a fluoropolymer having interpolymerized units derived from a nitrogen-containing cure site monomer; a catalyst composition that includes a compound of the formula:

$\{RA\}^{(-)}\{QR'_k\}^{(+)}$ or the precursors thereof added separately or as a mixture; and a compound of the formula:

$R''_2SO_x$.

In the above formula, R is hydrogen or a $C_1$–$C_{20}$ alkyl or alkenyl, $C_3$–$C_{20}$ cycloalkyl or cycloalkenyl, or $C_6$–$C_{20}$ aryl or aralkyl. R can contain at least one heteroatom, i.e., a non-carbon atom such as O, P, S, and N, such as an ether linkage. R can be unsubstituted or substituted, such as where one or more hydrogen atoms in the group is replaced with F, Cl, Br, or I. As used herein, substituted means that any group can be included provided that it does not interfere with the desired result. Each R can be perfluorinated, partially fluorinated, or non-fluorinated. A is an acid anion or an acid derivative anion. Q is phosphorous (P), sulfur (S), nitrogen (N), arsenic (As), or antimony (Sb), and k is the valence of Q plus one. Each R' is, independently, hydrogen or a nonfluorinated, partially fluorinated, or perfluorinated, substituted or unsubstituted $C_1$–$C_{20}$ alkyl, aryl, aralkyl, or alkenyl group.

As described above, A is an acid anion or an acid derivative anion. For example, A can be $COO$, $CO_3$, $SO_3$, $SO_2$, $SO_2NH$, $PO_3$, $PO_4$, $CH_2OPO_3$, $(CH_2O)_2PO_2$, $C_6H_4O$, $OSO_3$, O (in the cases where R is aryl or alkylaryl), $SO_2NR'$, $SO_2NSO_2R'$, and $SO_2CRSO_2R'$ and in aspects of the invention preferably $COO$, $CO_3$, O, $C_6H_4O$, $SO_3$, $OSO_3$, or $SO_2NR'$, most preferably $COO$, $CO_3$, O, $SO_3$, and $OSO_3$; R' is defined as R (above), and a particular selection for R' may be the same or different from the R attached to A, and one or more A groups may be attached to R;

R' can be unsubstituted or substituted. Examples of substituents suitable for R' include the halogens (e.g., chlorine, fluorine, bromine, iodine), cyano, $OR^3$, and $COOR^3$ groups wherein $R^3$ is selected from hydrogen or the alkali or alkaline earth metals, wherein H, K, Na, and $NH_4$ are preferred, $C_1$ to $C_{20}$ alkyl, aryl, aralkyl, alkenyl, and R (as described above) groups. In addition, any pair of said R' groups may be connected to each other and the Q atom to form a heterocyclic ring.

Each R" is independently a $C_1$–$C_{30}$ alkyl, aralkyl. The two R" groups can together form a heterocyclic $C_3$–$C_{30}$ cycloalkyl, aryl, or aralkyl. Each R" can be perfluorinated, partially fluorinated, or non-fluorinated. Each R" can be substituted or unsubstituted. The subscript x is 1 or 2.

In another aspect, the invention relates to a composition comprising a perfluoropolymer comprising interpolymerized units derived from a nitrogen-containing cure site monomer, a curing agent, and a compound having the formula $R''_2SO_x$, wherein each R" is independently $C_1$–$C_{30}$ alkyl, aralkyl, the R" groups together form a heterocyclic $C_3$–$C_{30}$ cycloalkyl, aryl, or aralkyl, each R" can be fluorinated, and x is 1 or 2. The curing agent can be any known compound useful in curing a perfluoroelastomer having interpolymerized units including a nitrogen-containing cure site monomer. Such curing agents include, e.g., peroxides, aminophenols, and other known curing agents.

In other aspects, the invention provides a method of making a fluoropolymer composition involving providing a composition comprising the steps of forming a mixture comprising the fluoropolymer, catalyst composition, and additive as described above, shaping the mixture, and curing the shaped mixture (e.g., press-curing and optionally post-curing). The invention also provides articles containing the curable or cured compositions such as hoses, gaskets, and O-rings.

The compositions retain the advantages of the use of nitrogen-containing cure site monomers (e.g., nitrile group containing cure site monomers) such as the high temperature performance properties typically achieved when triazine-forming compounds are used as the catalyst system with such cure site monomers.

In addition, the inventive compositions can be cured much more quickly than comparative systems without adversely affecting the physical properties of the cured fluoropolymer, and without reducing scorch resistance, i.e., without curing prematurely.

The compositions of the invention can be cured faster albeit using lower amounts of catalyst and or curative than comparative systems lacking all of the components of the invention. The properties of the cured fluoropolymers of the invention include surprisingly better compression set resistance, while the other physical properties are at least as good as comparable fluoropolymer compounds made without the inventive compositions.

The inventive compositions are useful in applications where high temperature exposure and/or harsh chemical exposure are possible or even expected.

The details of one or more embodiments of the invention are set forth in the description below. Other features, objects, and advantages of the invention will be apparent from the description and from the claims.

DETAILED DESCRIPTION

The composition of the present invention comprises a fluoropolymer, a catalyst composition, and a composition of the formula $R''_2SO_x$.

Suitable fluoropolymers include interpolymerized units derived from a nitrogen-containing monomer and, preferably, at least two principal monomers. Examples of suitable candidates for the principal monomer include per-fluoroolefins (e.g., tetrafluoroethylene (TFE) and hexafluoropropylene (HFP)), chlorotrifluoroethylene (CTFE), perfluorovinyl ethers (e.g., perfluoroalkyl vinyl ethers and perfluoroalkoxy vinyl ethers), and optionally, hydrogen-containing monomers such as olefins (e.g., ethylene, propylene, and the like), and vinylidene fluoride (VDF). Such fluoropolymers include, for example, fluoroelastomer gums and semi-crystalline fluoroplastics.

When the fluoropolymer is perhalogenated, preferably perfluorinated, it contains at least 50 mole percent (mol %) of its interpolymerized units derived from TFE and/or CTFE, optionally including HFP. In one embodiment of the invention, the balance of the interpolymerized units of the fluoropolymer (typically 10 to 50 mol %) is made up of one or more perfluoro vinyl ethers and a nitrogen-containing cure site monomer (e.g., a nitrile-containing vinylether or an imidate containing vinylether). The cure site monomer makes up at least about 0.1 mol %, more preferably at least about 0.3 mol % of the fluoropolymer. The cure site monomer comprises about 5 mol % or below, more preferably about 2 mol % or below, of the fluoropolymer.

The fluoropolymers of the invention are perfluorinated or have less than about 10 mol % of their interpolymerized units derived from hydrogen-containing monomers. When the fluoropolymer is not perfluorinated, it contains from about 75 to about 90, 95 or even 99 mol % of its interpolymerized units derived from TFE, CTFE, HFP, and/or other perfluorinated olefins, and less than about 10 mol %, more preferably less than about 5, and in other embodiments 1 mol % or even less of its interpolymerized units derived from VDF, ethylene, and/or propylene, and up to about 40 mol % of its interpolymerized units derived from a vinyl ether that is preferably perfluorinated, and from about 0.1 to about 5 mol % (more preferably from about 0.3 to about 2 mol %) of a nitrogen-containing cure site monomer.

Perfluoroolefins useful in the invention include those of the formula:

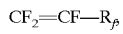

$$CF_2=CF-R_f,$$

wherein $R_f$ is fluorine or a $C_1$–$C_8$ (preferably $C_1$–$C_3$) perfluoroalkyl.

Suitable perfluorinated vinyl ethers include those of the formula:

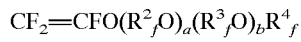

$$CF_2=CFO(R^2_fO)_a(R^3_fO)_bR^4_f$$

where $R^2_f$ and $R^3_f$ are the same or are different linear or branched $C_1$–$C_6$ perfluoroalkylene groups; a and b are, independently, 0 or an integer from 1 to 10; and $R^4_f$ is a $C_1$–$C_4$ perfluoroalkyl group.

A preferred class of perfluoroalkyl vinyl ethers includes compositions of the formula:

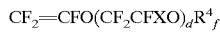

$$CF_2=CFO(CF_2CFXO)_dR^4_f$$

wherein X is F or $CF_3$; d is 0–5, and $R^4_f$ is a $C_1$–$C_6$ perfluoroalkyl group.

Most preferred perfluoroalkyl vinyl ethers are those where d is 0 or 1 and each $R^2_f$, $R^3_f$, and $R^4_f$ contains 1–3 carbon atoms. Examples of such perfluorinated ethers include perfluoromethyl vinyl ether, perfluoroethyl vinyl ether, and perfluoropropyl vinyl ether.

Other useful perfluorinated monomers include those compounds of the formula:

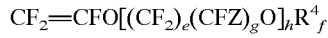

$$CF_2=CFO[(CF_2)_e(CFZ)_gO]_hR^4_f$$

where $R^4_f$ is a $C_1$–$C_6$ perfluoroalkyl group, e is 1–5, g is 0–5, h is 0–5, and Z is F or $CF_3$. Preferred members of this class are those in which $R^4_f$ is $C_3F_7$, e is 1 or 2, g is 0 or 1, and h is 1.

Additional perfluoroalkyl vinyl ether monomers useful in the invention include those of the formula:

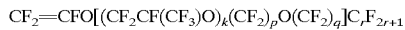

$$CF_2=CFO[(CF_2CF(CF_3)O)_k(CF_2)_pO(CF_2)_q]C_rF_{2r+1}$$

where k is 0–10, p is 1–6, q is 0–3, and r is 1–5. Preferred members of this class include compounds where k is 0 or 1, p is 1–5, q is 0 or 1, and r is 1.

Perfluoroalkoxy vinyl ethers useful in the invention include those of the formula:

$$CF_2=CFO(CF_2)_t[CF(CF_3)]_uO(CF_2O)_wC_xF_{2x+1}$$

wherein t is 1–3, u is 0–1, w is 0–3, and x is 1–5, preferably 1. Specific, representative, examples of useful perfluoroalkoxy vinyl ethers include $CF_2=CFOCF_2OCF_2CF_2CF_3$, $CF_2=CFOCF_2OCF_3$, $CF_2=CFO(CF_2)_3OCF_3$, and $CF_2=CFOCF_2CF_2OCF_3$. Mixtures of perfluoroalkyl vinyl ethers and perfluoroalkoxy vinyl ethers may also be employed.

In addition, partially-fluorinated monomers or hydrogen-containing monomers such as olefins (e.g., ethylene, propylene, and the like), and vinylidene fluoride can be used in the fluoropolymer of certain embodiments of the invention where the fluoropolymer is not completely perfluorinated. In such cases, the quantity of interpolymerized units derived from partially-fluorinated monomers or hydrogen-containing monomers is preferably less than 10 mole percent of the fluoropolymer. In other embodiments, the hydrogen-containing monomers is preferably less than 5 mol % or more preferably less than 1 mol % or even 0 mol % of the fluoropolymer.

One example of a useful fluoropolymer is composed of principal monomer units of tetrafluoroethylene and at least one perfluoroalkyl vinyl ether. In such copolymers, the copolymerized perfluorinated ether units constitute at least about 10 mol %, more preferably at least about 15 mol % of the total monomer units present in the polymer. The copolymerized perfluorinated ether units constitute around 50 mol % or less, more preferably about 40 mol % or less, of the total monomer units present in the polymer.

One or more other fluoropolymers may be blended with the fluoropolymer having interpolymerized units derived from a nitrogen-containing cure site monomer. In addition, one or more other fluoropolymers (which may include one or more copolymers) may be blended with the fluoropolymer (which may comprise a copolymer) having interpolymerized units derived from a nitrogen-containing cure site monomer. Such other fluoropolymers useful in a blend and/or copolymer include the entire array described above, and including homopolymers and copolymers comprising the interpolymerized units mentioned above. For example, polytetrafluoroethylene (PTFE) and PFA (tetrafluoroethylene-perfluorovinylether) are useful. The other fluoropolymer(s) may lack interpolymerized units derived from a nitrogen-containing cure site monomer and/or may include reactive sites adapted to a selected curative system. For example, two different fluoropolymers, each having interpolymerized units derived from a nitrogen-containing cure site monomer, such as a monomer comprising a nitrile group, may be blended to provide the fluoropolymer for the present invention.

Another fluoropolymer may be included along with another curative, such as described below, to provide particular properties. For example, a fluoropolymer suitable for peroxide curing and a peroxide curative may be included to improve chemical stability. Such a blend balances the thermal stability and the chemical stability of the resultant blend, and also may provide economic benefits. These other curatives also may be used to cure a blend of fluoropolymers having nitrogen-containing cure site monomers without the need to include a fluoropolymer lacking a nitrogen-containing cure site monomer.

The fluoropolymer(s) having nitrogen-containing cure site monomers preferably make up enough of the total fluoropolymer to provide increased thermal stability over a comparative fluoropolymer that lacks the composition of the present invention. This amount is generally at least 25 weight percent (wt %), more preferably at least 50 wt %, of the total fluoropolymer in this embodiment of the invention. In some embodiments, the fluoropolymer mixture consists essentially of fluoropolymer(s) having nitrogen-containing interpolymerized units.

The fluoropolymers may be prepared by methods known in the art. For example, the polymerization process can be carried out by free-radical polymerization of the monomers as an aqueous emulsion polymerization or as a solution polymerization in an organic solvent. When fluoropolymer blends are desired, a preferable route of incorporation is through blending the fluoropolymer latices in the selected ratio, followed by coagulation and drying.

The nature and the amount of end groups are not critical to the success in curing the fluoroelastomers of the invention. For example, the polymer can contain $SO_3^{(-)}$ end groups generated by an APS/sulfite system, or the polymer may contain $COO^{(-)}$ end groups generated by an APS initiator system or the fluoroelastomer can have "neutral" end groups, e.g., those generated by the use of fluorosulfinate initiator systems or organic peroxides. Chain transfer agents of any kind can significantly reduce the number of polar end groups. If desired, such as for improved processing, the presence of strong polar end groups such as $SO_3^{(-)}$ can be minimized and in the case of $COO^{(-)}$ end groups, the amount can be reduced through post treatments (e.g., decarboxylation).

The cure site component allows one to cure the fluoropolymer. The cure site component can be partially or fully fluorinated. At least one cure site component of at least one fluoropolymer comprises a nitrogen-containing group. Examples of nitrogen-containing groups useful in the cure site monomers of the present invention include nitrile, imidate, amidine, amide, imide, and amine-oxide groups. Useful nitrogen-containing cure site monomers include nitrile-containing fluorinated olefins and nitrile-containing fluorinated vinyl ethers, such as:

$CF_2=CFO(CF_2)_LCN$ $CF_2=CFO[CF_2CF(CF_3)O]_q(CF_2O)_yCF(CF_3)CN$ $CF_2=CF[OCF_2CF(CF_3)]_rO(CF_2)_tCN$ $CF_2=CFO(CF_2)_uOCF(CF_3)CN$ where, in reference to the above formulas, L=2–12; q=0–4; r=1–2; y=0–6; t=1–4; and u=2–6. Representative examples of such monomers include $CF_2=CFO(CF_2)_3OCF(CF_3)CN$, perfluoro(8-cyano-5-methyl-3,6-dioxa-1-octene), and $CF_2=CFO(CF_2)_5CN$.

Another suitable cure site component useful in the present invention is a fluoropolymer or fluorinated monomer material containing a halogen that is capable of participation in a peroxide cure reaction. Such a halogen may be present along a fluoropolymer chain and/or in a terminal position. Typically the halogen is bromine or iodine. Copolymerization is preferred to introduce the halogen in a position along a fluoropolymer chain. In this route, a selection of the comonomers mentioned above are combined with a suitable fluorinated cure site monomer. Such a monomer can be selected, for example, from the general formula $Z-R_f-O_x-CF=CF_2$, wherein Z is Br or I, $R_f$ is a substituted or unsubstituted $C_1-C_{12}$ fluoroalkylene, which may be perfluorinated and may contain one or more ether oxygen atoms, and x is 0 or 1. When x is 0, examples of the bromo- or iodo-fluoroolefins include: bromodifluoroethylene, bromotrifluoroethylene, iodotrifluoroethylene, 1-bromo-2,2-difluoroethylene, and 4-bromo-3,3,4,4-tetrafluorobutene-1, and the like. When x is 1, examples of the bromo- or iodo-fluorovinyl ethers include: $BrCF_2OCF=CF_2$, $BrCF_2CF_2OCF=CF_2$, $BrCF_2CF_2CF_2OCF=CF_2$, $CF_3CF(Br)CF_2OCF=CF_2$, and the like. In addition, non-fluorinated bromo- or iodo-olefins, e.g., vinyl bromide and 4-bromo-1-butene, can be used.

The amount of cure site component in a side chain position of the fluoropolymer is generally at least about 0.05 mol %, more preferably at least about 0.1 mol %. The amount of cure site component in a side chain position of the fluoropolymer is generally below about 5 mol %, more preferably about 2 mol % or below.

The cure site component may also occur in the terminal position of a fluoropolymer chain. Chain transfer agents or initiators are used to introduce the halogen in a terminal position. Generally, a suitable chain transfer agent is introduced in the reaction medium during polymer preparation, or derived from a suitable initiator.

Examples of useful chain transfer agents include those having the formula $R_fZ_x$ wherein $R_f$ is a substituted or unsubstituted $C_1-C_{12}$ fluoroalkyl radical, which may be perfluorinated, Z is Br or I, and x is 1 or 2. Specific examples involving bromide include: $CF_2Br_2$, $Br(CF_2)_2Br$, $Br(CF_2)_4Br$, $CF_2(Cl)Br$, $CF_3CF(Br)CF_2Br$, and the like.

Examples of useful initiators include $NaO_2S(CF_2)_nX$, wherein X is Br or I, and n is 1–10.

The amount of cure site component in a terminal position in the fluoropolymer is generally at least about 0.05 mol %, more preferably at least about 0.1 mol %. The amount of cure site component in a terminal position in the fluoropolymer is generally below about 5 mol %, more preferably about 2 mol % or below.

Cure site component combinations are also useful. For example, a fluoropolymer containing a halogen that is capable of participation in a peroxide cure reaction may also contain a nitrogen-containing cure site component such as a nitrile group-containing cure site component. Generally, at least about 0.1 mol %, more preferably at least about 0.3 mol % of the total cure site component is incorporated into the fluoropolymer. Generally, below about 5 mol %, more preferably about 2 mol % or below of the total cure site component is incorporated into the fluoropolymer.

The fluoropolymer compositions of the present invention are cured, at least in part, using an organo-onium catalyst composition. This composition can be the reaction product of an organo-onium (such as a halide, hydroxide, alkoxide, etc.) and an acid or acid salt.

In one aspect, the catalyst composition includes at least one anionic functional group having the formula:

$$R(A^{(-)})_n$$

wherein A is an anionic acidic group or anionic derivative of an acidic group, n is 1–10, wherein R is hydrogen or a $C_1$–$C_{20}$ alkyl, alkenyl, alkylene, alkenylene, or higher-functional organic moiety, cyclic, aryl, or a combination thereof, wherein R is nonfluorinated, partially fluorinated, or perfluorinated, and wherein, when n is 2, R may be a direct bond between two A groups. This catalyst composition also includes at least one cationic functional group having the formula:

$$QR'_k{}^{(+)}$$

wherein Q is selected from phosphorous, sulfur, nitrogen, arsenic, or antimony, wherein each R' is independently selected from hydrogen and a nonfluorinated, partially fluorinated, or perfluorinated, $C_1$–$C_{20}$ alkyl, aryl, aralkyl, or alkenyl group, and wherein k is the valence of Q plus one. The catalyst composition is a compound comprising the anionic functional group and the cationic functional group or the precursors thereof added separately or as a mixture. For example, an acid comprising the anionic functional group may be added to the fluoropolymer along with a salt of the cationic functional group may be used, or a compound comprising both types of functional groups may be used.

In another aspect, the catalyst composition includes a compound of the general formula:

$$\{RA\}^{(-)}\{QR'_k\}^{(+)}$$

wherein R, A, Q, R', and k are as described above. Preferred anions include those wherein R is selected from alkyl, benzyl, and phenyl, and A is selected from COO, $SO_3$, and wherein A is O in the cases where R is aryl or alkaryl.

The catalyst can be prepared by any known means. One example for catalyst preparation involves converting a commercially-available hydroxide precursor to a benzoate or acetate complex. Another example involves reacting an onium halide with an acid metal salt in a solvent, filtering the precipitated metal halide, and removing the solvent. Other routes will be apparent to the skilled artisan.

More specifically, the anionic functional group (RA) in the catalyst of the present invention may be a carboxylate, alkoxide, sulfate, sulfonate, or phenolate. As used herein, "substituted" means substituted by conventional substituents that do not interfere with the desired product, and "Ph" is phenyl. Suitable anions include the non-perfluorinated anions of the general formula:

$$R_x\text{-Ph}_y\text{-}\{(CH_2)_n\text{-D}\}_m$$

wherein each $R_x$ is the same or different alkenyl or alkyl of 1 to 10 carbon atoms, which may be substituted or unsubstituted, x is 0 to 5, y is 0 or 1, n is 0 to 10, m is 1 to 5, and D is selected from COO, $OSO_3$, $SO_3$, and O (when y is 1), provided that the sum of x and m is 6 or less and provided that x and y are not both zero.

Useful anion examples include Ph-COO, Ph-O, $CH_3$—$(CH_2)_p$—O—$SO_3$ when p is 1 to 10, and carboxylates of the general formula R—COO wherein R is alkenyl, an alkyl of 1 to 10 carbon atoms, e.g., acetate or propionate, or an aryl of 6 to 20 carbon atoms. Multi-carboxylates, multi-sulfates, multi-sulfonates, and combinations thereof are also useful, e.g., $$^{(-)}OOC{-}(CX_2)_n{-}COO^{(-)} \text{ and } ^{(-)}(OOC{-}(CX_2)_n{-}OSO_3^{(-)}$$

wherein n is 0 to 10 and X is H, F, or Cl, and Ph-(($CH_2$)$_p$—$COO^{(-)}$)$_q$ wherein p and q are independently 1 to 4. A preferred species of bifunctional carboxylic acid is oxalic acid in the case of multi carboxylates, sulfates, and combinations. In certain aspects of the invention, the $(CX_2)_n$ chain is fluorinated or perfluorinated, e.g., OOC—$(CF_2)_n$—COO. The anionic functional group, or RA, can also be a material selected from $CF_3CF(CF_3)CH_2O$ and $C_nF_{2n+1}CH_2O$ wherein n is 0 to 100 (preferably 0 to 20, and more preferably 0 to 10). Other examples include the anion and anions (one or more functional groups may remain as the acid) of ethylenediamine tetraacetic acid, triethylenetetraamine hexaacetic acid, pyromellitic acid, and 1,3,5-cyclohexane carboxylic acid. In addition, combinations of two or more compounds as described above can be used.

Representative aromatic polyoxy compounds include the non-perfluorinated di-, tri-, and tetraoxybenzenes, naphthalenes, and anthracenes, and bisphenols of the formula:

$$^{(-)}O_z\text{-Ph-G}_y\text{-Ph-O}_z{}^{(-)}$$

wherein G is a bond or a difunctional aliphatic, cycloaliphatic, or aromatic radical of 1 to 13 carbon atoms, or a thio, oxy, carbonyl, sulfinyl, or sulfonyl radical, G and/or Ph are optionally substituted with at least one chlorine or fluorine atom, y is 0 or 1, each z is, independently, 1 or 2, and any aromatic ring of the polyoxy compound is optionally substituted with at least one atom of chlorine, fluorine, or bromine atom, or carboxyl or an acyl radical (e.g., —COR, where R is H or a $C_1$ to $C_8$ alkyl, aryl or cycloalkyl group) or alkyl radical with, for example, 1 to 8 carbon atoms. In the above bisphenol formula that the oxygen groups can be attached in any position (other than number one) in either ring. Blends of two or more such compounds can also be used. The mono and bis complexes of the formula:

$$R_x\text{-Ph-O-QR}'_k$$

are also useful. A preferred class of these materials includes the bisphenols, such as those having the general formula: $^{(-)}O\text{-Ph-C}(CX_3)_2\text{-Ph-O}^{(-)}$, wherein X is H, Cl, or F (e.g., bisphenol AF). When multifunctional acids are used, the mono-, bis-, and multi-complexes with $QR'_k$ can be used.

As is known in the art, an organo-onium is the conjugate acid of a Lewis base (e.g., phosphine, amine, and sulfide) and can be formed by reacting said Lewis base with a suitable alkylating agent (e.g., an alkyl halide or acyl halide) resulting in an expansion of the valence of the electron donating atom of the Lewis base and a positive charge on the organo-onium compound. The preferred organo-onium compounds for the present invention contain at least one heteroatom, i.e., a non-carbon atom such as P, S, or N, bonded to organic moieties.

One class of quaternary organo-onium compounds particularly useful in the present invention broadly comprises relatively positive and relatively negative ions wherein a phosphorus, sulfur, or nitrogen generally comprises the central atom of the positive ion, and the negative ion is an alkyl or cycloalkyl acid anion that may be non-fluorinated, partially fluorinated, i.e., at least one hydrogen atom is replaced with fluorine, provided that at least one hydrogen atom remains, or perfluorinated.

Examples of suitable precursor compounds (and cationic functional group materials) when Q is phosphorous include tetramethylphosphoniums, tributylallylphosphoniums, tributylbenzylphosphoniums, dibutyldiphenylphosphoniums, tetrabutylphosphoniums, tributyl(2-methoxy) propylphosphoniums, triphenylbenzylphosphoniums, and tetraphenylphosphoniums. These phosphoniums can be hydroxides, chlorides, bromides, alkoxides, phenoxides, etc. The tetraalkyl phosphonium hydroxides and tetraalkyl phosphonium alkoxides are preferred.

Another class of phosphonium compounds include those selected from the group consisting of amino-phosphonium, phosphorane (e.g., triarylphosphorane), and phosphorous containing iminium compounds.

The amino-phosphonium compounds useful in the present invention include those described in the art, e.g., in U.S. Pat. No. 4,259,463 (Moggi et al.).

The class of phosphonium compounds useful in this invention include phosphorane compounds such as tri-arylphosphorane compounds; some of the latter compounds are known and are described in the art, see for example, U.S. Pat. No. 3,752,787 (de Brunner), which descriptions are herein incorporated by reference. Such phosphorane compounds are first reacted with an acid to form a salt, which salt is then used as a curative component. Some of the tri-arylphosphorane compounds useful in this invention have the general formula:

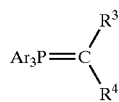

wherein Ar is aryl, selected for example, from phenyl, substituted phenyl, e.g., methoxyphenyl, chlorophenyl, tolyl, and other known groups, e.g., naphthyl. $R^3$ and $R^4$ are selected from the group consisting of (1) separate groups selected individually from (a) hydrogen, methyl, ethyl, propyl, and carbalkoxy ($C_1$–$C_6$ alkyl) in the case of $R^3$, and (b) carbalkoxy ($C_1$–$C_6$ alkyl) cyano, and —$CONH_2$ in the case of $R^4$; and (2) a single group which together with the carbon atom to which the single group is attached form a cyclic group selected from the following:

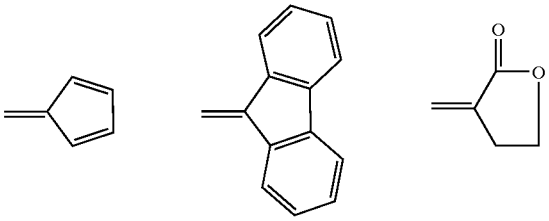

Representative phosphonium compounds include benzyltris(dimethylamino) phosphonium chloride, and bis(benzyldiphenylphosphine)iminium chloride.

Sulfonium compounds useful in this invention have at least one sulfur atom ionically associated with an anion and covalently bonded to three organic moieties (R') by means of carbon-sulfur covalent bonds. Said organic moieties can be the same or different. The sulfonium compounds may have more than one relatively positive sulfur atom, e.g., [($C_6H_5$)$_2S^+(CH_2)_4S^+(C_6H_5)_2$] 2Cl$^-$, and two of the carbon-sulfur covalent bonds may be between the carbon atoms of a divalent organic moiety, i.e., the sulfur atom may be a heteroatom in a cyclic structure.

A class of sulfonium compounds useful in the present invention are salts having the formula:

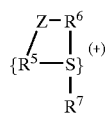

wherein $R^5$, $R^6$, and $R^7$ can be the same or different, provided that at least one of such groups is aromatic, and such groups can be selected from C4–C20 aromatic radicals (e.g., substituted and unsubstituted phenyl, thienyl, and furanyl) and C1–C20 alkyl radicals. The alkyl radicals include substituted alkyl radicals (e.g., substitutents such as halogen, hydroxy, alkoxy, aryl. Z is selected from oxygen; sulfur; >S=O; >C=O; —$SO_2$—; —$NR^8$—; where $R^8$ is aryl or acyl (such as acetyl, benzoyl, etc.); a carbon-to-carbon bond; and —$CR^9R^{10}$— where $R^9$ and $R^{10}$ are selected from the group consisting of hydrogen, $C_1$–$C_4$ alkyl radicals, and $C_2$–$C_4$ alkenyl radicals.

Preferably, the sulfonium compounds have at least one aryl group for R'.

When Q is nitrogen, the preferred positive ion has the general formula is $NR'_4$ or $HNR'_3$, wherein R' is as described above. Representative quaternary organo-oniums useful as precursor compounds include phenyltrimethylammoniums, tetrapentylammoniums, tetrapropylammoniums, tetrahexylammoniums, tetraheptylammoniums, tetramethylammoniums, tetrabutylammoniums, tributylbenzyl ammoniums, tributylallylammoniums, tetrabenzylammoniums, tetraphenylammoniums, diphenyl diethylamino ammoniums, triphenylbenzylammoniums, 8-benzyl-1,8-diazabicyclo[5.4.0]undec-7-eniums, benzyltris(dimethylamino) phosphoniums, and bis(benzyldiphenyl phosphine)iminiums. These ammoniums can be hydroxides, chlorides, bromides, alkoxides, phenoxides, etc. Of these positive ions, tetrabutylammonium and tetraphenylammonium are preferred.

When Q is As or Sb, the preferred positive ions include tetraphenylarsonium chloride and tetraphenylstibonium chloride.

Overall, the tetraalkylphosphonium compounds are more preferred for the positive ion or cationic functional group of the catalyst.

In one aspect, the preferred the anionic functional group is selected from the formula $CF_3(CF_2)_nCOO^{(-)}$ wherein n is 1, 2, or 6, and $QR'_k$ is selected from tetrabutylphosphonium and tributyl(2-methoxy)propylphosphonium. In another aspect, the anionic functional group is selected from the formula $^{(-)}OOC(CF_2)_nCOO^{(-)}$ wherein n is 2 or 4, and wherein $QR'_k$ is selected from tetrabutylphosphonium and tributyl(2-methoxy)propylphosphonium. In still another aspect, the anionic functional group is selected from acetate and benzoate, and wherein $QR'_k$ is selected from tetrabutylphosphonium and tributyl(2-methoxy)propylphosphonium. In yet another aspect, the catalyst composition is selected from $CF_3$—O—$(CF_2)_n$COOQR'$_k$ wherein n is 2 or 4 and $QR'_k$ is as defined in claim 1, $CF_3$—O—$CF_2CF_2$COOP$(C_4H_9)_4$, and bis-tetrabutyl phosphonium perfluoro adipate.

Mixtures of organo-onium compounds are also useful in this invention.

The precursors described above are generally commercially available (e.g., from Aldrich Chemicals, Milwaukee, Wis.) or may be prepared by procedures known in the art.

In addition, blends of two or more catalyst compounds as described above, which includes blends of two or more anionic functional groups or RA groups and/or two or more cationic functional groups or $QR'_k$ groups, can be used.

The catalyst composition of the present invention can be prepared by any suitable method. For example, the two components of the active complex used as the catalyst composition in the present invention, $\{RA\}^{(-)}\{QR'_k\}^{(+)}$, can be incorporated separately as an acid or a salt, e.g., RAX wherein X is selected from hydrogen or the alkali or alkaline earth metals, of which H, K, Na, and $NH_4$, are preferred, and $QR'_kZ$, wherein Z is selected from an anion, which may be organic or inorganic, preferably $Cl^{(-)}$, $Br^{(-)}$, $^{(-)}OH$, $^{(-)}OR^3$ or $SO_4^{(2-)}$. The two components can be added to the inventive elastomer gum separately or as a mixture. In this method, the active complex is formed in situ during processing, heating, and curing. To avoid contamination and the inclusion of extractables, which is especially important for clean applications (e.g., semiconductors), the complexes should be prepared before incorporation into the fluoroelastomer composition, and the resulting salts, XZ, should be filtered or washed out before the active complex is incorporated into the elastomer gum. Other suitable methods, which are known in the art, also may be used to prepare the catalyst composition. For example, the two components of the catalyst composition can be dissolved into a suitable solvent (e.g., an alcohol) before precipitating and filtering out the resulting salt, XZ. Salt formation can be avoided by reacting the onium component as the onium-hydroxide or onium-alkoxide with the acid component of the catalyst composition (e.g., reacting $Bu_4POH$ with RCOOH). The active complexes can be incorporated into the elastomer gum when dissolved in a solvent or as a dried compound. An excess of the $QR'_k$ material (e.g., tetraalkyl phosphonium chloride) or the free acid (e.g., RAH) does not detrimentally affect the properties of the polymer.

An effective amount of the selected curative compound (e.g., $\{RA\}^{(-)}\{QR'_k\}^{(+)}$) is used to crosslink the fluoropolymer. When the amount of curative is too low, the fluoropolymer may not crosslink sufficiently to develop the desired physical properties and/or may crosslink more slowly than desired. When the amount of curative is too high, the fluoropolymer may crosslink into a material that is less compliant than desired and/or may crosslink too rapidly for the desired process conditions. The selection of a particular composition can affect the amount of curative desired. For example, the type and/or amount of filler selected may retard or accelerate curing relative to a similar, but unfilled, composition, requiring an appropriate adjustment in the amount of curative that is known to those skilled in the art. The composition of the fluoropolymer also affects the amount of one or more curatives. For example, when a blend of a nitrile containing fluoropolymer and another fluoropolymer lacking nitrile cure sites is used, an effective amount of a first selected curative compound is used to crosslink the fluoropolymer having interpolymerized units derived from a nitrile group-containing monomer together with an effective amount of a second selected curative compound used to crosslink the other fluoropolymer. The first and second selected curatives may have the same or different composition. That is, either one or both selected curatives may function to crosslink either one or both fluoropolymers.

Generally, the effective amount of curative, which may include more than one composition, is in the range of 0.2 to 10 millimoles curative per hundred parts of gum (mmhr) (more preferably 0.5 to 5 mmhr).

The invention also includes a compound of the formula $R''_2SO_x$. In this formula, R'' and x are as described above. Such compounds include diorgano sulfoxides ($R''_2SO$) and diorgano sulfones ($R''_2SO_2$) wherein each R is an organic radical. The two R groups may together form a single alkylene group, i.e., a heterocyclic ring. The carbon skeletal chain of the R groups may be linear, branched, or cyclic and may be aliphatic or aromatic and may include one or more heteroatoms(s), such as oxygen. The chain may be unsubstituted or substituted with any substituent(s) that do not interfere with the desired result.

Among the useful $R''_2SO_x$ compounds are dialkyl sulfoxides and dialkyl sulfones such as dimethyl sulfoxide and dimethyl sulfone with the latter being preferred in certain embodiments. Other useful compounds include dimethyl sulfoxide, tetramethylene sulfoxide, dimethyl sulfone, and tetramethylene sulfone. The compound also can be halogenated, e.g., substituted with Cl, Br, F. In one embodiment, the $R''_2SO_x$ compound is at least partially fluorinated, such that at least one hydrogen atom in at least one R group is replaced with F. In addition, more than one such hydrogen atom may be replaced with fluorine, up to and including the case where the R groups are completely fluorinated.

One of the advantages of the present invention is controllable cure rheology. After an initial drop in torque, corresponding to an increase in temperature of the material, the inventive compositions have available a relatively long period of time ("induction time") after which the torque increases rapidly to its final or maximum value. The rapid increase in the torque corresponds to a rapid increase in the viscosity of the composition as it crosslinks. The induction time is controllable from seconds to several minutes. This allows a sufficient amount of induction time for a particular inventive composition to be formed or molded before the onset of cure. This rheology also provides a rapid completion of the cure cycle after the cure onset, so the cure cycle is not unnecessarily prolonged. Thus, compositions of the present invention can be completely formed or molded rapidly, cured to a state that they can be handled without damage, and removed from the mold.

The fluoropolymer composition curing can also be modified by using other types of curatives along with the catalyst of the present invention. Examples of such curatives are known and include bis-aminophenols (e.g., as described in U.S. Pat. No. 5,767,204 and U.S. Pat. No. 5,700,879), bis-amidooximes (e.g., as described in U.S. Pat. No. 5,621, 145), and ammonium salts (e.g., as described in U.S. Pat. No. 5,565,512). In addition, organometallic compounds of arsenic, antimony, and tin can be used, e.g., as described in U.S. Pat. No. 4,281,092, and U.S. Pat. No. 5,554,680. Particular examples include allyl-, propargyl-, triphenylallenyl-, and tetraphenyltin and triphenyltin hydroxide. Other examples of such curatives include those described in copending U.S. patent application Ser. No. 10/136,020, filed Apr. 29, 2002, such as the catalyst composition that includes a compound having the general formula $R_3N.HA$, wherein the group HA is an inorganic or organic acid, e.g., HCl, HNO$_3$, C$_7$F$_{15}$COOH, and wherein each R is, independently, the same or different C$_1$–C$_{20}$ alkyl group, which may be cyclic or heterocyclic, and one R group may instead be a bond to another R group such that the nitrogen is bonded to or part of an alkenyl, cycloalkenyl, or aromatic group. The substituents may also be olefinic, e.g., mono, di, and trialkyl amine salts, and pyridine salts. Further examples of these catalyst compositions include compounds of the formula:

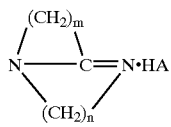

wherein m and n are, independently, 2 to 20. Further examples of such curatives include those described in copending U.S. patent application Ser. No. 09/951,921, filed Sep. 11, 2001, such as the divalent metal amine complex compound represented by the general formula:

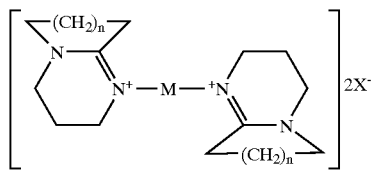

wherein M is a divalent metal, X is an anionic group, and n is 2 to 6, preferably 3 to 5, more preferably 3 or 5. Examples of suitable divalent metals include Mg, Ni, Co, Zn, Pb, Fe, Sn, Cd, and Ca, with magnesium and zinc being preferred. Examples of suitable anionic groups include halide (e.g., chloride, bromide, or iodide), hydroxylate, alkoxylate, carboxylate, phenoxide, sulfonate, sulfate, sulfite, carbonate, and nitrate groups, with halides such as chlorides being preferred. This formula includes, for example, complexes of 1,8-diazabicyclo[5,4,0]undec-7-ene (DBU) and 1,5-diazabicyclo [4,3,0]non-5-ene (DBN). These complexes may be prepared, for example, by reacting DBU or DBN with a metal salt (e.g., a metal halide) in an organic solvent such as methanol or acetone.

The fluoroelastomer compositions of the invention can be cured using one or more ammonia-generating compounds along with the catalysts described above. "Ammonia-generating compounds" include compounds that are solid or liquid at ambient conditions but that generate ammonia under conditions of cure. Such compounds include, for example, hexamethylene tetramine (urotropin), dicyandiamide, and metal-containing compounds of the formula:

A$^{w+}$(NH$_3$)$_x$Y$^{w-}$ wherein A$^{w+}$ is a metal cation such as Cu$^{2+}$, Co$^{2+}$, Co$^{3+}$, Cu$^+$, and Ni$^{2+}$; w is equal to the valance of the metal cation; y$^{w-}$ is a counterion, typically a halide, sulfate, nitrate, acetate or the like; and x is an integer from 1 to about 7.

Also useful as ammonia-generating compounds are substituted and unsubstituted triazine derivatives such as those of the formula:

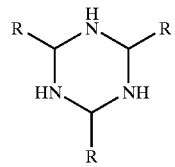

wherein R is a hydrogen or a substituted or unsubstituted C$_1$–C$_{20}$ alkyl, aryl, or aralkyl group. Specific useful triazine derivatives include hexahydro-1,3,5-s-triazine and acetaldehyde ammonia trimer.

The fluoroelastomer compositions of the invention, including the nitrogen containing cure site monomer-containing fluoropolymer alone, can be cured using one or more peroxide curatives along with the catalysts described above. Suitable peroxide curatives generally are those which generate free radicals at curing temperatures, such as those described in WO 99/48939, the disclosure of which is herein incorporated by reference. Dialkyl peroxide and bis(dialkyl peroxide), each of which decomposes at a temperature above 50° C., are especially preferred. In many cases it is preferred to use a di-tertiarybutyl peroxide having a tertiary carbon atom attached to peroxy oxygen atom. Among the most useful peroxides of this type are 2,5-dimethyl-2,5-di (tertiarybutylperoxy)hexyne-3 and 2,5-dimethyl-2,5-di (tertiarybutylperoxy)hexane. Other peroxides can be selected from such compounds as dicumyl peroxide, dibenzoyl peroxide, tertiarybutyl perbenzoate, a,a'-bis(t-butylperoxy-diisopropylbenzene), and di[1,3-dimethyl-3-(t-butylperoxy)-butyl]carbonate. Generally, about 1 to 3 parts of peroxide per 100 parts of perfluoroelastomer is used.

Another curative useful in the present invention has the general formula:

CH$_2$=CH—R$_f$—CH=CH$_2$,

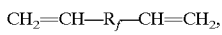

wherein one or more H atoms may be replaced with halogen atoms, such as F, and R$_f$ is a C$_1$–C$_8$ linear or branched and at least partially fluorinated alkylene, cycloalkylene, or oxyalkylene. Similarly, polymers containing pendant groups of CH$_2$=CHR$_f$— are also useful as curatives in the present invention. Such curatives are described, for example, in U.S. Pat. No. 5,585,449.

The combination of catalyst and curative is generally from about 0.01 to about 10 mol % (more preferably from about 0.1 to about 5 mol %) of the total fluoropolymer amount.

The fluoropolymer compositions can include any of the adjuvants commonly employed in curable fluoropolymer formulations. For example, one material often blended with a fluoropolymer composition as a part of a curative system is a coagent (sometimes also referred to as a co-curative) composed of a polyunsaturated compound that is capable of cooperating with the peroxide curative to provide a useful cure. These coagents are particularly useful in combination with a peroxide curative. The coagent(s) can generally be added in an amount equal to between 0.1 and 10 parts coagent per hundred parts fluoropolymer (phr), preferably between 1 and 5 phr. Examples of coagents useful with the organo-onium compound of the present invention include triallyl cyanurate; triallyl isocyanurate; tri(methylallyl) isocyanurate; tris(diallylamine)-s-triazine; triallyl phosphite; N,N-diallyl acrylamide; hexaallyl phosphoramide; N,N,N', N'-tetraalkyl tetraphthalamide; N,N,N',N'-tetraallyl malonamide; trivinyl isocyanurate; 2,4,6-trivinyl methyltrisiloxane; and tri(5-norbornene-2-methylene)cyanurate. Particularly useful is triallyl isocyanurate. Other useful coagents include the bis-olefins disclosed in EP 0 661 304 A1, EP 0 784 064 A1 EP 0 769 521 A1, and U.S. Pat. No. 5,585,449.

One embodiment of the invention includes an alcohol of the general formula $R^2$—OH, wherein $R^2$ is alkyl group having from 1 to 20 carbon atoms, more preferably 6 to 12 carbon atoms. $R^2$ can be fluorinated, e.g., $R_f$—$CH_2$—OH or $R_f$—$CH_2CH_2$—OH wherein $R_f$ is a perfluoroalkyl, e.g., $C_nF_{2n+1}$ where n is 1 to 20, or perfluorocycloalkyl, e.g., $C_mF_{2m-1}$ where m is 3 to 20, or a $C_1$–$C_{20}$ fluoroalkenyl. As used herein, "partially fluorinated" means where one or more F atoms in the alkyl group is replaced with H, Cl, Br, or I, provided at least one F atom remains, which includes perfluorinated. $R_f$ can also contain at least one heteroatom, i.e., a non-carbon atom such as O, P, S, or N.

While the addition of alcohol is not required, it may be helpful to modify the viscosity and cure characteristics of the composition. The alcohol is selected to be compatible in the overall composition. The alcohol should also remain in a mixture of fluoropolymer with catalyst during milling operations. The alcohol preferably should evaporate during subsequent processing at higher temperatures, such as during post-cure operations. Examples of presently preferred alcohols include octanol and decanol. An effective amount of alcohol is used in the curative system. This amount is determined by several factors including the desired ratio of alcohol to catalyst, the particular alcohol chosen, and the milling temperature. The particular level for a selected composition is normally a matter of routine experimentation. Generally, this amount is in the range of 0.01 to 10 (more preferably 0.5 to 5) parts by weight alcohol per hundred parts by weight fluoropolymer.

Thus, a particular composition of the present invention may include two or more fluoropolymer(s) (provided that at least one fluoropolymer includes interpolymerized units derived from a nitrogen-containing cure site monomer), a catalyst composition, a compound of the formula $R''_2SO_x$, a peroxide curative selected to crosslink one or more than one of the fluoropolymer(s), optionally a coagent such as triallyl isocyanurate, and optionally, an alcohol.

In one embodiment, the fluoropolymer composition of the invention is derived from interpolymerized units consisting essentially of one or more perfluoroolefin(s), one or more perfluorovinylether(s), and a nitrile-containing cure site monomer. In this embodiment, one useful catalyst composition comprises $(R')_4QOCO(CF_2)_nCOOQ(R')_4$, wherein n is 0 to 10 and Q and R' are as defined above.

Additives such as carbon black, stabilizers, plasticizers, lubricants, fillers, and processing aids typically utilized in fluoropolymer compounding can be incorporated into the compositions, provided that they have adequate stability for the intended service conditions. In particular, low temperature performance can be enhanced by incorporation of perfluoropolyethers. See, e.g., U.S. Pat. No. 5,268,405.

Carbon black fillers are typically also employed in fluoropolymers as a means to balance modulus, tensile strength, elongation, hardness, abrasion resistance, conductivity, and processability of the compositions. Suitable examples include MT blacks (medium thermal black) designated N-991, N-990, N-908, and N-907; FEF N-550; and large particle size furnace blacks. When large size particle black is used, 1 to 70 parts filler per hundred parts fluoropolymer (phr) is generally sufficient.

Fluoropolymer fillers may also be present in the compositions. Generally, from 1 to 50 phr of fluoropolymer filler is used. The fluoropolymer filler can be finely divided and easily dispersed as a solid at the highest temperature used in fabrication and curing of the inventive composition. By solid, it is meant that the filler material, if partially crystalline, will have a crystalline melting temperature above the processing temperature(s) of the curable composition(s). The preferred way to incorporate fluoropolymer filler is by blending latices. This procedure, including various kinds of fluoropolymer filler, is described in U.S. Ser. No. 09/495,600, filed 1, Feb. 2000, the disclosure of which is herein incorporated by reference.

One or more acid acceptors can also be added to the formulations. However, where the presence of extractable metallic compounds is undesirable (such as for semiconductor applications) the use of inorganic acid acceptors should be minimized, and preferably avoided altogether. Commonly used acid acceptors include, for example, zinc oxide, calcium hydroxide, calcium carbonate, magnesium oxide, silicon dioxide (silica), etc. These compounds generally are used in the fluoropolymer formulation to bind any HF or other acids that might be generated at the high temperatures such as may be encountered during curing steps or at the temperatures where the fluoropolymers are intended to function.

The curable fluoropolymer compositions of the invention may also be combined with other curable fluoropolymer compositions such as peroxide-curable fluoropolymer compositions. These additional curable fluoropolymer compositions may also employ small amounts of cure site monomers as a comonomer. Suitable cure site monomers are those which, when combined with a curative (e.g., a peroxide) and, preferably a coagent, will provide a cured composition. Preferably these cure site monomers include at least one halo group (e.g., a bromo or an iodo group).

The curable fluoropolymer compositions can be prepared by mixing one or more fluoropolymer(s), the catalyst, any selected additive or additives, any additional curatives (if desired), and any other adjuvants (if desired) in conventional rubber processing equipment. The desired amounts of compounding ingredients and other conventional adjuvants or ingredients can be added to the unvulcanized fluorocarbon gum stock and intimately admixed or compounded therewith by employing any of the usual rubber mixing devices such as internal mixers, (e.g., Banbury mixers), roll mills, or any other convenient mixing device. The temperature of the mixture during the mixing process typically should not rise above about 120° C. During mixing, it is preferable to distribute the components and adjuvants uniformly throughout the gum for effective cure.

The mixture is then processed and shaped, such as by extrusion (e.g., into the shape of a tube or a hose lining) or by molding (e.g., in the form of an O-ring seal). The shaped article can then be heated to cure the gum composition and form a cured article.

Molding or press curing of the compounded mixture usually is conducted at a temperature sufficient to cure the mixture in a desired time duration under a suitable pressure. Generally, this is between about 95° C. and about 230° C., preferably between about 150° C. and about 205° C., for a period of from about 1 minute to 15 hours, typically from 5 minutes to 30 minutes. A pressure of between about 700 kPa and about 21,000 kPa is usually imposed on the compounded mixture in a mold. The molds first may be coated with a release agent and prebaked.

The cure rheology of the compositions of the present invention maintain near their minimum viscosities during typical processing operations, providing improved scorch resistance and greater options in processing conditions over known materials. Significantly, the advantages in processing do not detrimentally affect the resulting physical properties of the final cured product and the resultant fluoropolymers of the present invention have excellent high-temperature properties and low compression set values.

The molded mixture or press-cured article is then usually post-cured (e.g., in an oven) in air or nitrogen at a temperature and for a time sufficient to complete the curing, usually between about 150° C. and about 300° C., typically at about 232° C., for a period of from about 2 hours to 50 hours or more, generally increasing with the cross-sectional thickness of the article. For thick sections, the temperature during the post cure is usually raised gradually from the lower limit of the range to the desired maximum temperature. The maximum temperature used is preferably up to about 300° C., and this value is held for about 4 hours or more. This post-cure step generally completes the cross-linking and may also release residual volatiles from the cured compositions. One example of a suitable post-cure cycle involves exposing molded parts to heat in air using several stages of conditions. First, the parts are held at an elevated temperature e.g., 175° C. for several hours e.g., 16 hours. Then the temperature is increased to 200° C. and the parts are held at this temperature for 4 hours. Then the temperature is increased the temperature is increased to 250° C. and the parts are held at this temperature for 4 hours. Then the parts are held at 275° C. for 8 hours. Finally, the oven heat is turned off and the parts return to room temperature.

Shaped articles such as O-rings exhibit one of the advantages of the invention. For example, the O-ring test (described below) shows that the invention provides compression set values of 70% or below, 65% or below, 60% or below, 55% or below, 50% or below, 45% or below, and various levels included within the ranges described.

The fluoropolymer compositions are useful in production of articles such as O-rings, gaskets, tubing, and seals. Such articles are produced by molding a compounded formulation of the fluoropolymer composition with various additives under pressure, curing the article, and then subjecting it to a post-cure cycle. The curable compositions formulated without inorganic acid acceptors are particularly well suited for applications such as seals and gaskets for manufacturing semiconductor devices, and in seals for high temperature automotive uses.

The invention will now be described further by way of the following examples.

EXAMPLES

The indicated results were obtained using the following test methods, unless otherwise noted. The test results appear in the table below.

Test Methods

Cure rheology: Tests were run on uncured, compounded samples using a Monsanto Moving Die Rheometer (MDR) Model 2000 in accordance with ASTM D 5289-93a at 370° F. (188° C.), no pre-heat, 12 minutes elapsed time, and a 0.5 degree arc. Both the minimum torque ($M_L$) and highest torque attained during a specified period of time when no plateau or maximum torque was obtained ($M_H$) were measured. Also measured were the time for the torque to increase 2 units above $M_L$ ("$t_s2$"), the time for the torque to reach a value equal to $M_L+0.5(M_H-M_L)$ ("t'50"), and the time for the torque to reach $M_L+0.9(M_H-M_L)$ ("t'90").

Mooney Scorch: Measurements were taken at 121° C., following the procedures described in ASTM D 1646. Minimum viscosity (units), and the time in minutes to increase to various viscosity levels were recorded. For example, the time to reach a 3, 12, and 18 unit rise was recorded. The test was stopped after 2 h (120 min) if no viscosity increase occurred.

Press-Cure: Sample sheets measuring 150×150×2.0 mm were prepared for physical property determination by pressing at about 6.9 Mega Pascal (MPa) for 10 minutes at 188° C., unless otherwise noted.

Post-Cure: Press-cured sample sheets were exposed to heat in air using the following four stages of conditions: 16 h at 175° C.; 4 h at 200° C.; 4 h at 250° C.; and 8 h at 275° C. The samples were returned to ambient temperature before testing.

Physical Properties: Tensile Strength at Break, Elongation at Break, and Modulus at 100% Elongation were determined using ASTM D 412-92 on samples cut from the press- and post-cured sheet with ASTM Die D. Units are reported MPa.

Hardness: Samples were measured using ASTM D 2240-85 Method A with a Type A-2 Shore Durometer. Units are reported in points on the Shore A scale.

Compression Set: O-ring samples were measured using ASTM 395-89 Method B, 70 h at 316° C. and 25% deflection. The O-rings had a cross-sectional thickness of 0.139 in. (3.5 mm.). Results are reported as a percentage of the original deflection.

Materials

Fluoropolymer A: A fluoropolymer prepared by emulsion polymerization having interpolymerized units of 65.9 mole percent tetrafluoroethylene (mol % TFE), 33.3 mol % perfluoromethyl vinyl ether (PMVE), and 0.8 mol % of a nitrogen group-containing cure site monomer, $CF_2$=CFO$(CF_2)_5$CN.

Fluoropolymer B: A fluoropolymer prepared by emulsion polymerization having interpolymerized units of 65.7 mole percent tetrafluoroethylene (mol % TFE), 33 mol % perfluoromethyl vinyl ether (PMVE), and 1.3 mol % of a nitrogen group-containing cure site monomer, $CF_2$=CFO$(CF_2)_5$CN. The resulting latex was blended (at 80 wt %) with 20 wt % of a fluoropolymer latex commercially available as Dyneon™ Fluorothermoplastic PFA 6900N from Dyneon LLC, Oakdale, Minn. The latex blend was then coagulated, washed, and dried to yield Fluoropolymer B.

Catalyst Preparation: A 2 L round bottom flask was equipped with magnetic stirring, a temperature probe, and connection to a nitrogen bubbler. The flask was charged with 188 g (0.65 mole) perfluoroadipic acid (made from octafluoroadipoyl fluoride available from SynQuest Laboratories, Inc., Alachua, Fla.) and 488 g of distilled water. While stirring, 898 g (1.3 mole) of a 40 wt % aqueous solution of tetrabutyl ammonium hydroxide (available from Aldrich) was added over 1 h. A slight exothermic reaction was observed. The mixture was stirred for another hour at room temperature (around 23° C.). The flask was heated to 65° C. under a reduced pressure of 15 torr (2 kPa) to remove water to give 523 g (0.65 mole) of $(C_4H_9)_4$POCO$(CF_2)_4$COOP$(C_4H_9)_4$ in quantitative yield. The bis-(tetrabutyl phosphonium)-perfluoroadipate had a melting point of 123° C. and FNMR confirmed the structure and 2 to 1 molar ratio.

Catalyst Masterbatch: A mixture of 80 weight percent (wt %) of a fluoropolymer having interpolymerized units of 65.7 mol % TFE, 33 mol % PMVE, and 1.3 mol % $CF_2$=CFO$(CF_2)_5$CN was blended using a two-roll mill with 20 wt % of the bis-tetrabutyl phosphonium perfluoro adipate.

All other materials were commercially available from Aldrich Chemical Co., Milwaukee, Wis. unless otherwise indicated.

Examples 1–2

A combination of Fluoropolymer A (94 g) was compounded with: 1.5 g fumed silica (available as Aerosil R 972 from Degussa Corp., Parsippany, N.J.), 15 g N550 carbon black, 7.5 g of the Catalyst Masterbatch, and 0.5 g dimethyl sulfone. Example 2 was prepared as in Example 1 except that 1.0 g dimethyl sulfone was used.

Cure rheology tests were run on the uncured, compounded sample. The results are included in the table. A sheet of the compounded admixture was pressed cured and tested and subsequently post-cured. The post-cured samples were tested for compression set. All test results are included in the tables below.

Examples 3–4

In Example 3, a combination of Fluoropolymer B (96 g) was compounded with: 1.5 g fumed silica (Aerosil R 972), 5 g of the Catalyst Masterbatch, 4 g $TiO_2$ (available as Titone A/110 from Sakai Chemicals, Osaka, Japan), and 0.5 g dimethyl sulfone. Example 4 was prepared as in Example 3 except that 96 g Fluoropolymer A was used along with 15 g N550 carbon black, and no TiO$_2$ was used. Samples were prepared and tested as in Example 1. The results are included in the tables below.

Example 5

A combination of Fluoropolymer A (96 g) was compounded with: 1.5 g silica (Aerosil R 972), 5 g of the Catalyst Masterbatch, and 1 g dimethyl sulfone. Samples were prepared and tested for Cure Rheology as in Example 1 and Mooney Scorch. The results are included in the tables below.

Comparative Examples 1–2 (CE-1 and CE-2)

CE-1 was compounded and tested as in Example 1 but without dimethyl sulfone. CE-2 was compounded and tested as in CE-1 but with 94 g Fluoropolymer B (rather than Fluoropolymer A) and with 4 g TiO$_2$ rather than the carbon black.

A few of the advantages of certain embodiments of the invention are described following. Examples 1 and 2 demonstrated the improvement in curing speed with the invention, as compared with CE-1 and CE-2 with the same level of catalyst. Example 2 showed further improvement in physical properties, especially compression set, as compared to CE-1. Example 3 demonstrated similar cure speed, similar physical properties, and better compression set as compared to CE-2, while the inventive material included 33% less catalyst. Example 4 showed that filler could be used to increase modulus while keeping compression set similar to Example 3. Example 5 demonstrated the scorch resistance properties of one embodiment of the invention.

TABLE 1

Test Results

| Example: | 1 | 2 | 3 | 4 | 5 | CE-1 | CE-2 |
|---|---|---|---|---|---|---|---|
| Cure Rheology | | | | | | | |
| M$_L$ (Nm) | 0.107 | 0.101 | 0.122 | 0.129 | 0.125 | 0.133 | 0.115 |
| M$_H$ (Nm) | 1.290 | 1.273 | 1.695 | 1.287 | 1.504 | 1.352 | 1.751 |
| t$_s$2 (min) | 1.94 | 1.83 | 1.82 | 3.02 | 2.56 | 2.39 | 1.66 |
| t'50 (min) | 2.49 | 2.38 | 2.8 | 4.06 | 3.61 | 3.11 | 2.56 |
| t'90 (min) | 3.84 | 3.82 | 5.67 | 7.01 | 6.55 | 4.91 | 5.37 |
| Press- and Post-Cured | | | | | | | |
| Tensile (MPa) | 14.31 | 15.47 | 15.87 | 16.93 | N/M | 14.00 | 17.44 |
| Elongation (%) | 260 | 280 | 220 | 193 | N/M | 253 | 238 |
| 100% modulus (MPa) | 5.19 | 5.58 | 4.92 | 7.36 | N/M | 5.78 | 4.86 |
| Hardness (shore A) | 75 | 73 | 76 | 76 | N/M | 76 | 74 |
| Compression Set | | | | | | | |
| Percent | 70.3 | 59.5 | 43.8 | 44.8 | N/M | 69.3 | 50.9 |

In the table above, N/M indicates that the property was not measured.

In addition, Mooney Scorch was measured on the fluoropolymer of Example 5. The minimum was 7.94 N m, and the t3, t10, and t18 tests were all stopped after 120 minutes without a viscosity increase.

A number of embodiments of the invention have been described. Nevertheless, it will be understood that various modifications may be made without departing from the spirit and scope of the invention.

We claim:

1. A composition comprising:
   (a) a fluoropolymer comprising interpolymerized units derived from a nitrogen-containing cure site monomer and less than about 10 mole percent of interpolymerized units derived from hydrogen-containing monomers;
   (b) a catalyst composition comprising at least one anionic functional group having the formula:

$R(A^{(-)})_n$ wherein A is an anionic acidic group or anionic derivative of an acidic group, n is 1–10, wherein R is hydrogen or a C$_1$–C$_{20}$ alkyl, alkenyl, alkylene, alkenylene, or higher-functional organic moiety, cyclic, aryl, or a combination thereof, wherein R is nonfluorinated, partially fluorinated, or perfluorinated, and wherein, when n is 2, R may be a direct bond between two A groups.
   and comprising at least one cationic functional group having the formula:

$QR'_k{}^{(+)}$ wherein Q is selected from phosphorous, sulfur, nitrogen, arsenic, or antimony, wherein each R' is independently selected from hydrogen and a nonfluorinated, partially fluorinated, or perfluorinated, C$_1$–C$_{20}$ alkyl, aryl, aralkyl, or alkenyl group, and wherein k is the valence of Q plus one;
   wherein the catalyst composition is a compound or the precursors thereof added separately or as a mixture;
   (c) a composition having the formula:

$R''_2SO_x$ wherein each R" is independently C$_1$–C$_{30}$ alkyl, aralkyl, the R" groups together form a heterocyclic C$_3$–C$_{30}$ cycloalkyl, aryl, or aralkyl, each R" is optionally nonfluorinated, partially fluorinated, or perfluorinated, and x is 1 or 2.

2. The composition of claim 1 wherein the compound (c) is selected from the group consisting of a dialkyl sulfoxide and a dialkyl sulfone.

3. The composition of claim 1 wherein the compound (c) is selected from the group consisting of dimethyl sulfoxide, tetramethylene sulfoxide, dimethyl sulfone, and tetramethylene sulfone.

4. The composition of claim 1 wherein the compound (c) is at least partially halogenated.

5. The composition of claim 1 wherein the compound (c) is at least partially fluorinated.

6. The composition of claim 1 further comprising an alcohol of the general formula $R^2$—OH, wherein $R^2$ is a $C_1$–$C_{20}$ alkyl group, and wherein $R_2$ is optionally fluorinated.

7. The composition of claim 1 wherein A is selected from the group consisting of: COO, $CO_3$, O when R is aryl or alkylaryl, $SO_3$, $SO_2$, $SO_2NH$, $PO_3$, $PO_4$, $CH_2OPO_3$, $(CH_2O)_2$ $PO_2$, $C_6H_4O$, $OSO_3$, $SO_2NR'$, $SO_2NSO_2R'$, and $SO_2CRSO_2R'$ wherein R' is as defined in claim 1.

8. The composition of claim 1 wherein the anionic functional group(s) are selected from the group consisting of:

the formula $R_x$-$Ph_y$-{$(CH_2)_n$-D}$_m$ wherein each $R_x$ is the same or different $C_1$–$C_{10}$ alkenyl or alkyl, x is 0 to 5, y is 0 or 1, n is 0 to 10, m is 1 to 5, and D is selected from the group consisting of COO, $CO_3$, $OSO_3$, $SO_3$, $PO_4$, and O (when y is 1), provided that the sum of x and m is 6 or less and provided that x and y are not both zero;

RCOO wherein R is alkenyl, a $C_1$–$C_{10}$ alkyl, or a $C_6$–$C_{20}$ aryl;

$^{(-)}$OOC—$(CX_2)_n$—COO$^{(-)}$ wherein n is 0 to 10, X=H, F, or Cl;

Ph-$((CH_2)_p$—COO$^{(-)})_q$ wherein p and q are independently 1 to 4;

$CF_3CF(CF_3)CH_2O$ or $C_nF_{2n+1}CH_2O$ wherein n is 0 to 100;

anion or anions of ethylenediamine tetraacetic acid, triethylenetetraamine hexaacetic acid, pyromellitic acid, and 1,3,5-cyclohexane carboxylic acid;

and blends of two or more such compounds.

9. The composition of claim 1 wherein the anionic functional group(s) are selected from the group consisting of:

general formula $^{(-)}O_z$-Ph-$G_y$-Ph-$O_z$$^{(-)}$ wherein G is a bond or a difunctional aliphatic, cycloaliphatic, or $C_1$–$C_{13}$ aromatic radical, or a thio, oxy, carbonyl, sulfinyl, or sulfonyl radical, G and/or Ph are optionally substituted with at least one Cl or F atom, y is 0 or 1, each z is, independently, 1 or 2, and any aromatic ring of the polyoxy compound is optionally substituted with at least one atom of Cl, F, or Br atom, or carboxyl, or an acyl radical, or an alkyl radical;

$^{(-)}$O-Ph-$C(CX_3)_2$-Ph-O$^{(-)}$, wherein X is H, Cl, or F;

and blends of two or more such compounds.

10. The composition of claim 1 wherein the cationic functional groups are selected from the group of tetramethylphosphoniums, tributylallylphosphoniums, tributylbenzylphosphoniums, dibutyldiphenylphosphoniums, tetrabutylphosphonium, tributyl(2-methoxy) propylphosphoniums, triphenylbenzylphosphoniums, tetraphenylphosphoniums, phenyltrimethylammoniums, tetrapentylammoniums, tetrapropylammoniums, tetrahexylammoniums, tetraheptylammoniums, tetramethylammoniums, tetrabutylammoniums, tributylbenzyl ammoniums, tributylallylammoniums, tetrabenzylammoniums, tetraphenylammoniums, diphenyl diethylamino ammoniums, triphenylbenzylammoniums, 8-benzyl-1,8-diazabicyclo[5.4.0]undec-7-eniums, benzyltris(dimethylamino) phosphoniums, and bis(benzyldiphenyl phosphine)iminiums.

11. The composition of claim 1 wherein the anionic functional group is selected from the formula $CF_3(CF_2)_n$COO$^{(-)}$ wherein n is 1, 2, or 6, and $QR'_k$ is selected from the group consisting of tetrabutylphosphonium and tributyl(2-methoxy)propylphosphonium.

12. The composition of claim 1 wherein the anionic functional group is selected from the formula $^{(-)}$OOC($CF_2$)$_n$COO$^{(-)}$ wherein n is 2 or 4, and wherein $QR'_k$ is selected from the group consisting of tetrabutylphosphonium and tributyl(2-methoxy)propylphosphonium.

13. The composition of claim 1 wherein the anionic functional group is selected from acetate and benzoate, and wherein $QR'_k$ is selected from the group consisting of: tetrabutylphosphonium and tributyl(2-methoxy)propylphosphonium.

14. The composition of claim 1 wherein the catalyst composition is selected from the group consisting of $CF_3$—O—$(CF_2)_n$COOQR'$_k$ wherein n is 2 or 4 and QR'$_k$ is as defined in claim 1, $CF_3$—O—$CF_2CF_2$COOP$(C_4H_9)_4$, and bis-tetrabutylphosphonium perfluoroadipate.

15. The composition of claim 1 wherein the catalyst composition is prepared in situ.

16. The composition of claim 1 wherein the catalyst composition is prepared from components dissolved in a solvent.

17. The composition of claim 1 wherein the fluoropolymer comprises interpolymerized units derived from (i) tetrafluoroethylene, and optionally (ii) one or more perfluorovinyl ethers of the formula: $CF_2$=$CFO(R^2{}_fO)_a(R^3{}_fO)_bR^4{}_f$ wherein $R^2{}_f$ and $R^3{}_f$ are the same or are different linear or branched $C_1$–$C_6$ perfluoroalkylene groups; a and b are, independently, 0 or an integer from 1 to 10; and $R^4{}_f$ is a $C_1$–$C_6$ perfluoroalkyl group.

18. The composition of claim 17 wherein the fluoropolymer further comprises interpolymerized units derived from monomers selected from the group consisting of perfluoroolefins, partially-fluorinated olefins, non-fluorinated olefins, vinylidene fluoride, and combinations thereof, provided that the hydrogen-containing monomers comprise less than about 10 mole percent of the fluoropolymer.

19. The composition of claim 1 wherein said cure site monomer is a nitrile-containing monomer having the formula $CF_2$=$CFO(CF_2)_L$CN; $CF_2$=$CFO(CF_2)_u$OCF($CF_3$)CN; $CF_2$=$CFO[CF_2CF(CF_3)O]_q(CF_2O)_y$CF($CF_3$)CN; or $CF_2$=$CF[OCF_2CF(CF_3)]_rO(CF_2)_t$CN; wherein L=2–12; q=0–4; r=1–2; y=0–6; t=1–4, and u=2–6; or perfluoro(8-cyano-5-methyl-3,6-dioxa-1-octene).

20. The composition of claim 1 wherein the fluoropolymer is derived from interpolymerized units consisting essentially of one or more perfluorolefin(s), one or more perfluorovinylether(s), and a nitrile-containing cure site monomer.

21. The composition of claim 20 wherein the catalyst composition comprises $(R')_4QOCO(CF_2)_n$COOQ$(R')_4$, wherein n is 0 to 10 and Q and R' are as defined in claim 1.

22. The composition of claim 1 further comprising a filler selected from the group consisting of fluoropolymer filler, carbon black, and combinations thereof.

23. The composition of claim 1 further comprising a fluoropolymer containing interpolymerized units derived from monomers selected from the group consisting of perfluoroolefins, partially-fluorinated olefins, non-fluorinated olefins, vinylidene fluoride, perfluorovinyl ethers, and combinations thereof, provided that the hydrogen-containing monomers comprise less than about 10 mole percent of the fluoropolymer.

24. The composition of claim 1 further comprising an additional curative material, optionally selected from the group consisting of ammonia-generating compounds, substituted triazine derivatives, unsubstituted triazine derivatives, peroxides, bis-aminophenols, bis-amidooximes, organotin compounds; a compound of the formula $R_3$N·HA, wherein the group HA is an inorganic or organic acid and wherein each R is, independently, the same or different $C_1$–$C_{20}$ alkyl group, which may be cyclic or heterocyclic, or a bond to another R group such that the nitrogen is bonded to or part of an alkenyl, cycloalkenyl, or aromatic group; and a divalent metal amine complex compound; and optionally a coagent.

25. The composition of claim 24 further comprising an alcohol of the general formula $R^2$—OH, wherein $R^2$ is a $C_1$–$C_{20}$ alkyl group, and wherein $R^2$ can be fluorinated.

26. The composition of claim 25 wherein the coagent is selected from the group consisting of triallyl cyanurate; triallyl isocyanurate; tri(methylallyl) isocyanurate; tris (diallylamine)-s-triazine; triallyl phosphite; N,N-diallyl acrylamide; hexaallyl phosphoramide; N,N,N',N'-tetraalkyl tetraphthalamide; N,N,N',N'- tetraallyl malonamide; trivinyl isocyanurate; 2,4,6-trivinyl methyltrisiloxane; and tri(5-norbornene-2-methylene)cyanurate.

27. An article comprising the fluoropolymer composition of claim 1.

28. The article of claim 27 having a Compression Set (70 h at 316° C. and 25% deflection) value selected from the group consisting of less than about 65%, less than about 60%, less than about 55%, less than about 50%, and less than about 45%.

29. A composition comprising: (a) a perfluoropolymer comprising interpolymerized units derived from a nitrogen-containing cure site monomer; (b) a curing agent; and (c) a compound having the formula $R''_2SO_x$, wherein each $R''$ is independently $C_1$–$C_{30}$ alkyl, aralkyl, the $R''$ groups together form a heterocyclic $C_3$–$C_{30}$ cycloalkyl, aryl, or aralkyl, each $R''$ can be fluorinated, and x is 1 or 2.

30. The composition of claim 29 wherein the curing agent comprises a compound of the formula: $\{RA\}^{(-)}\{QR'_k\}^{(+)}$ or the precursors thereof added separately or as a mixture, wherein R is hydrogen or a $C_1$–$C_{20}$ alkyl or alkenyl, $C_3$–$C_{20}$ cycloalkyl or cycloalkenyl, or $C_6$–$C_{20}$ aryl or aralkyl, which may be nonfluorinated, partially fluorinated, or perfluorinated, A is an acid anion or an acid derivative anion, Q is phosphorous, sulfur, nitrogen, arsenic, or antimony, each R' is, independently, hydrogen or a nonfluorinated, partially fluorinated, or perfluorinated, $C_1$–$C_{20}$ alkyl, aryl, aralkyl, or alkenyl group, and k is the valence of Q plus one.

31. A method of making a fluoropolymer composition comprising the steps of:
   a) forming a mixture comprising parts (a), (b), and (c), according to claim 1;
   b) shaping the mixture; and
   c) curing the shaped mixture.

32. The method of claim 31 wherein the catalyst is added in a form selected from the group consisting of a compound and a mixture of catalyst precursors.

33. The method of claim 31 wherein the step of curing further comprises press-curing and optionally post-curing.

* * * * *

UNITED STATES PATENT AND TRADEMARK OFFICE
CERTIFICATE OF CORRECTION

PATENT NO. : 6,887,927 B2
DATED : May 3, 2005
INVENTOR(S) : Grootaert, Werner M. A.

It is certified that error appears in the above-identified patent and that said Letters Patent is hereby corrected as shown below:

Column 2,
Line 8, delete "$\{RA\}^{(-)\{QR'_k\}}{}^{(+)}$" and insert -- $\{RA\}^{(-)}\{QR'_k\}^{(+)}$ --.

Column 8,
Line 20, delete "$^{(-)}OOC\text{-}(CX_2)_n\text{-}COO^{(-)}$" and $^{(-)}(OOC\text{-}(CX_2)_n\text{-}OSO_3{}^{(-)}$" and insert -- $^{(-)}OOC\text{-}(CX_2)_n\text{-}COO^{(-)}$ and $^{(-)}OOC\text{-}(CX_2)_n\text{-}OSO_3{}^{(-)}$ --.

Column 14,
Line 64, delete "norbomene" and insert -- norbornene --.

Column 21,
Line 3, delete "$R_2$" and insert -- $R^2$ --.
Line 33, delete "group(s)" and insert -- groups --.
Line 46, delete "groups" and insert -- group(s) --.
Line 46, after "group" insert -- consisting --.

Signed and Sealed this

First Day of November, 2005

JON W. DUDAS
*Director of the United States Patent and Trademark Office*

UNITED STATES PATENT AND TRADEMARK OFFICE
CERTIFICATE OF CORRECTION

PATENT NO. : 6,887,927 B2
APPLICATION NO. : 10/228507
DATED : May 3, 2005
INVENTOR(S) : Werner M. A. Grootaert et al.

It is certified that error appears in the above-identified patent and that said Letters Patent is hereby corrected as shown below:

Column 10
Line 34, delete "C4-C20" and insert -- $\mathbf{C_4\text{-}C_{20}}$ --, therefor.
Line 36, delete "C1-C20" and insert -- $\mathbf{C_1\text{-}C_{20}}$ --, therefor.

Column 18
Line 31, delete "ammonium" and insert -- phosphonium --, therefor.

Signed and Sealed this

Twenty-fourth Day of February, 2009

JOHN DOLL
*Acting Director of the United States Patent and Trademark Office*